United States Patent [19]

Jamison

[11] Patent Number: 5,025,887
[45] Date of Patent: Jun. 25, 1991

[54] SANITARY ACOUSTIC HORN

[76] Inventor: Michael V. Jamison, P.O. Box 806, Spring, Tex. 77383-0806

[21] Appl. No.: 439,592

[22] Filed: Nov. 20, 1989

[51] Int. Cl.$^5$ .......................................... G10K 11/00
[52] U.S. Cl. .................................. 181/187; 181/189; 381/156; 55/292
[58] Field of Search ................. 181/159, 179, 187–190; 381/156, 165, 154; 55/270, 274, 286, 292, 302

[56] References Cited

U.S. PATENT DOCUMENTS

| | | | |
|---|---|---|---|
| 2,071,153 | 2/1937 | Abrahams | 181/190 X |
| 2,854,091 | 9/1958 | Roberts et al. | 55/286 |
| 2,962,120 | 11/1960 | Lagarias | 55/292 |
| 3,053,031 | 9/1962 | Vedder et al. | 55/292 |
| 3,118,748 | 1/1964 | Delfs | 55/292 |
| 3,413,781 | 12/1968 | Abboud | 55/292 |
| 4,201,556 | 5/1980 | Olsson | 55/292 |
| 4,306,890 | 12/1981 | Gustavsson et al. | 55/302 X |
| 4,529,422 | 7/1985 | Phillips | 55/292 X |
| 4,865,159 | 9/1989 | Jamison | 181/179 |

Primary Examiner—Brian W. Brown
Attorney, Agent, or Firm—Bernard A. Reiter

[57] ABSTRACT

Disclosed is a sanitary acoustic horn for use in the dairy industry for preventing powder build-up in dairy industry drying systems and for meeting U.S.D.A. requirements for equipment which comes in contact with powder product. The sanitary acoustic horn includes a driver and a bell connected to one another by means of sanitary ferrules and quick connect hinged clamps. The sanitary acoustic horn is preferably made from 304 stainless steel and having at least a number 4 finish on all surfaces which will be exposed to powder product. A number 4 finish inhibits the collection of powder on such surfaces by eliminating pits, scratches, grooves and the like therefrom. The quick connect clamp allows for easy assembly and disassembly of the horn for a manual cleaning.

The sanitary horn further includes an air delivery chamber which extends about the driver. Such air delivery chamber has sufficient dimension to allow insertion of human fingers and cloths so that such surfaces may be easily cleaned. Further, all corners of the equipment which will come in contact with powder product are ground and polished to a minimum ¼' radius or, at least, to a minimum radius equal to the thickness of the material.

13 Claims, 3 Drawing Sheets

SANITARY ACOUSTIC HORN

1. BACKGROUND OF THE INVENTION

This invention relates to acoustic horns for cleaning dust and eliminating particulate build-up, and more particularly, to preventing powder build-up in drying systems such as for the dairy industry.

2. BRIEF DESCRIPTION OF THE PRIOR ART

Acoustic horns have been used for a variety of purposes related to material handling. Most commonly, sonic generators or loud speakers have been used to aid in cleaning filter media. Examples of this can be found in U.S. Pat. No. 2,962,120 to Lagarias, U.S. Pat. No. 3,118,748 to Delfs, U.S. Pat. No. 3,053,031 to Vedder, et al, U.S. Pat. No. 4,201,556 to Olsson, and U.S. Pat. No. 2,854,091 to Roberts, et al. Sound generators have also been used to aid in gas/particulate separation as shown in U.S. Pat. No. 3,158,455 to Lincoln and U.S. Pat. No. 3,413,781 to Abboud.

There are two primary considerations when fluidizing or densifying bulk powdered materials with acoustic horns. The first is the frequency. Frequencies of 125 Hz to 300 Hz have proven to be the optimum frequencies for sonic cleaning. Frequencies above 300 Hz are less effective in sonic cleaning. Further, such higher frequencies are audible and annoying to human hearing.

The second important consideration in fluidizing bulk powdered materials through the use of acoustic horns is the sound pressure level. The sound pressure level is usually measured in decibels. To be effective, the sound pressure level of the fundamental frequency should be above 130 decibels. The greater the sound pressure level, the more effective the cleaning. Thus, ideally, the acoustic horn used to fluidize bulk powdered solids should be capable of delivering low frequency sound waves at a high sound pressure level.

Acoustic horns produce a range of frequencies. The lowest frequency in the range of a particular acoustic horn is referred to as the fundamental frequency. It is the fundamental frequency measured in Hz which is used to rate acoustic horns.

Lower frequencies carry longer wave lengths than higher frequencies and thus have a greater impact on the surfaces in which they come in contact. As a result, given two horns which can produce an identical sound pressure level of 135 db, but having fundamental frequencies of 120 Hz and 300 Hz, the lower frequency acoustic horn will generate a greater acoustic energy with which to vibrate the bulk powdered materials.

For years, the dairy industries dry powder products plant have faced the problem of powder build-up in their drying systems. The powdered product starts building up on the dryer chamber or vessel walls and its interior surfaces where the liquid slurry is dried into the powder form. From this point, the powder flows from the dryer chamber or vessel by an airstream which enters a collection device where the powder product is separated from the airstream. The collection device is typically problem is encountered. The powder collects on the baghouse's hopper and side walls.

Further, there is what is typically referred to as a cell plate where the filter bag are attached to separate the powder from the airstream. Powder also builds up between the bags below this cell plate.

When a cyclone is used as a collecting device, powder builds up on the interior side walls and further, there is encountered a problem of powder bridging at the discharge.

The major problem with powder build-up is that over a period of hours, the outer layer becomes scorched and turns an off color, usually dark brown. As the powder becomes scorched from the long duration of heat exposure, it falls into the "Grade A" product stream. This creates off grade powder and must be sold as animal feed. When off grade powder is being discharged from the dryer's collection system, the system must be shut down and manually cleaned by scraping the walls and inner surfaces. The amount of powder which is cleaned from the inside of the dryer chamber or baghouse can be as much as 2,000 to 3,000 pounds. This powder can only be sold as animal feed at a price per pound appreciativelY less than the price at which Grade A powder can be sold.

Industrial type acoustic horns have been used in the dairy industry since at least 1987. Such horns have been used to vibrate the powder product from the internal surfaces in the baghouses. Such use has proved successful in eliminating up to 90% of the powder build-up which resulted in increased overall production of powdered skim milk, buttermilk, cheese, whey and infant formula. However, the United States Department of Agriculture, Dairy Products Division, became aware of the success of this new technology and began inspecting the design and construction of these industrial type acoustic horns which were coming in contact with the powdered products. A device which comes in contact with dairy powder must be easily cleanable and removable so that powder does not build-up thus forming a site for the potential growth for bacteria.

Heretofore, all acoustic horns were designed and constructed primarily for industrial application. In such applications it was not considered a problem to allow dust particles to build-up on the horns without any reasonable means of cleaning. Powdered material does build up on these industrial horns. In fact, material builds up into corners and rough welds of the fabricated bells of horns, the threads of the drivers of the horn, the bell coupling connections, and in the inner driver cavities where clearances are literally too small to clean. Also, many horns are fabricated in a manner where there is welding on only one side thus, often creating a seam or indentation on the opposite surface of the weld. This seam or crack allows particles to collect therein. Further, the finish of the industrial horns themselves, even if fabricated from stainless steel, is simply not a smooth enough finish to inhibit the accumulation of dust on the surface of the horn. Without at least a number 4 finish, there will be pits, sags, scratches, grooves, and uneven surfaces where particles were formed.

In July 1988, the U.S.D.A. banned all use of sonic horns in the dairy industry where they would come in contact with dairy powder because they may pose a health hazard. The acoustic horns described in the patents listed above all have similar shortcomings in that they are not designed to inhibit the amount of powder or dust collection on the horns themselves, and further, they are not designed such that they can easily be cleaned. By U.S.D.A. regulation, they cannot be used in the dairy industry where they would come in contact with dry powder.

SUMMARY OF THE INVENTION

It is therefore an object of the present invention to provide an acoustic horn which can be used by the dairy industry in the handling of powdered products.

It is a further object of the present invention to provide a sanitary horn which inhibits the collection of dust and powdered product thereon.

Yet another object of the present invention is to provide a sanitary acoustic horn which allows for efficient manual cleaning thereof.

Still a further object of the present invention is to provide a sanitary acoustic horn which the U.S.D.A. will allow to be used in the dairy industry.

Briefly stated, the foregoing and numerous other objects, features and advantages of the present invention are accomplished by designing a sanitary acoustic horn which can be constructed such that it is substantially seamless thereby eliminating a primary residence for powder accumulation. Further, the sanitary acoustic horn of the present invention is designed such that there are no internal right angles which come in contact with the powder product. Instead, what would otherwise be internal right angles are provided with a minimum ¼" radius to inhibit the collection and accumulation of powder product in such corners.

Further, the finish on the bell of the sanitary horn must be at least a number 4 sanitary finish or better. Such a finish inhibits the collection of powder product on the bell. A stainless steel finish inferior to number 4 would provide pits, valleys, sags and grooves enhancing the surface's ability to collect and accumulate powdered product.

Further, all openings in the horn are made at least big enough to insert human fingers to allow for easy manual cleaning. The entire design is made for quick and efficient disassembly to allow for manual cleaning.

The horn of the present invention includes sanitary ferrule connections which serve a dual role. First, such connections provide less area for accumulation of powdered product over standard flanged and threaded connections. Second, they allow quick and efficient assembly and disassembly without tools for cleaning purposes.

DESCRIPTION OF THE PREFERRED EMBODIMENTS

Figure 1:
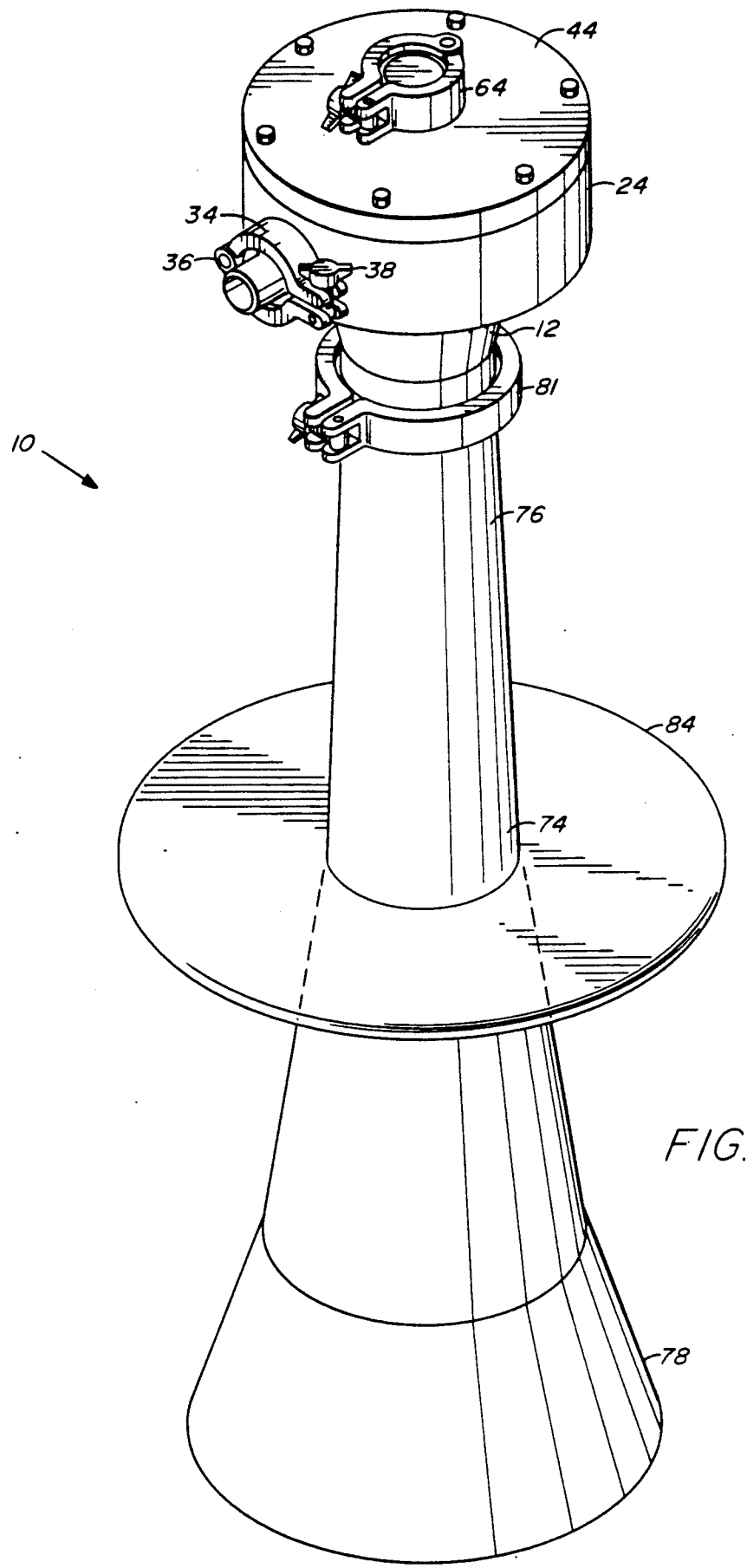
FIG. 1 is an isometric view of the sanitary acoustic horn of the present invention.
Figure 2:
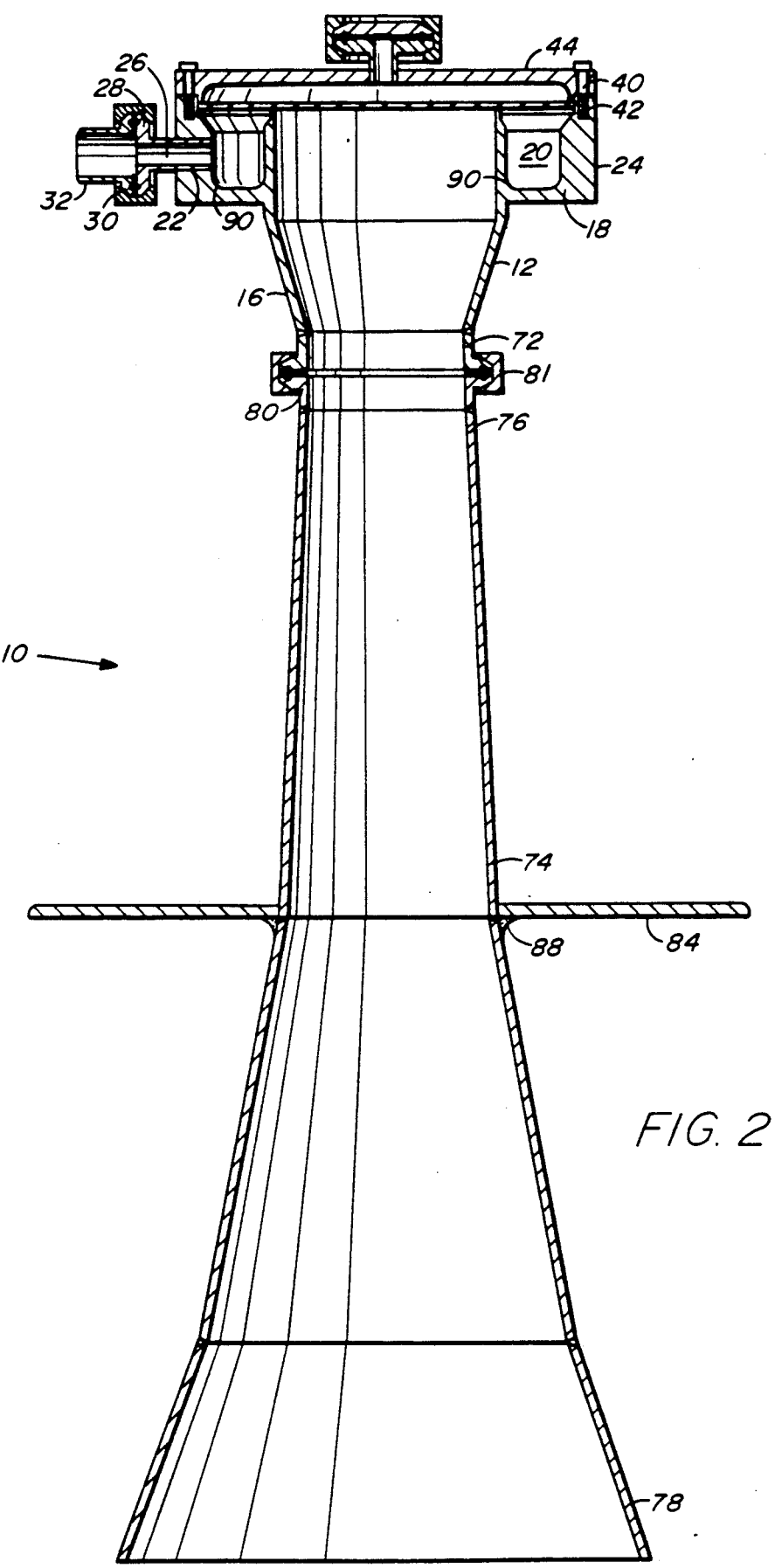
FIG. 2 is a cross-sectional view of the sanitary acoustic horn of the present invention.
Figure 3:
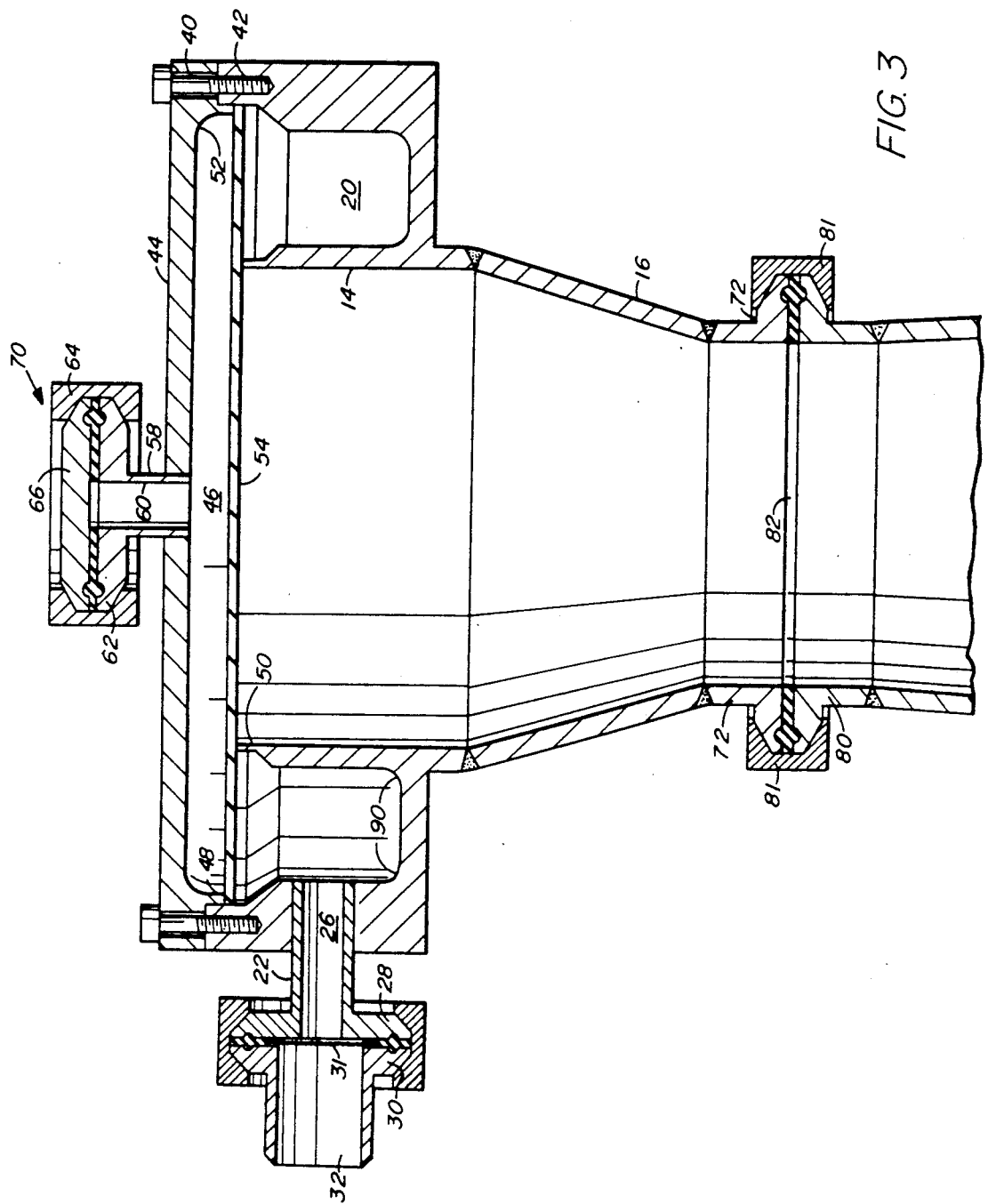
FIG. 3 is a detailed cross-sectional view of the acoustic horn of the present invention.

Turning first to FIG. 1, there is shown the sanitary acoustic horn 10 of the present invention. The horn 10 includes a driver 12 which includes a cylindrical section 14 and a conical section 16. As seen more clearly in FIG. 2, extending radially from cylindrical section 14 of bell 12 is air delivery housing 18. The outer face of cYlindrical section 14 and the inner face of air delivery housing 18 form an annular channel 20 around the outside of cylindrical section 14. There is a bore 22 through outside wall 24 of air delivery housing 18. Pipe nipple 26 is inserted through bore 22 such that the end of pipe nipple 26 is flush with the inside face of wall 24. The seam between the bore 22 and pipe nipple 26 is penetration welded and then ground flush to create an essentially seamless finish.

Attached to the opposite end of pipe nipple 26 is ferrule 28. A matching ferrule 30 is affixed to compressed air inlet nozzle 32. Ferrules 28 and 30 are joined together by clamp 34. It can be seen that clamp 34 includes hinge 36 and wing bolt 38 enabling quick coupling and uncoupling of ferrules 28 and 30. There is an O-ring type gasket 31 between ferrule 28 and ferrule 30. O-ring type gasket 31 includes filter screen which may be wire mesh or perforated. Such filter screen provides support for a fabric filter disk made of fiberglass and polyester or other acceptable filter disk material.

Wall 24 is provided with a series of longitudinal threaded bores 40 which will align with bores 42 of driver lid 44 such that driver lid 44 can be attached to driver 12 by means of threaded bolts. Driver lid 44 includes an internal cupped area 46. The depth of the internal cupped area 46 is enhanced by annular extension 48. There is a diaphragm support lip 50 extending from the cylindrical section 14 of driver 12. Note that cupped region 46 includes radius corner 52. Radius corner 52 is a minimum ¼" radius to inhibit the accumulation of powder in such corners.

Residing between annular extension 48 and diaphragmed support lip 50 is diaphragm 54. When lid 44 is mounted on driver 12, annular extension 48 resides in substantially a butting position with the inside face of wall 24. Diaphragm 54 extends between annular extension 48 and the inside face of wall 24 thereby pulling diaphragm 54 tight across diaphragm support lip 50. There is a bore 56 in diaphragm 54 which will allow pressure to equalize on each side of the diaphragm 56 when compressed air is no longer being delivered through inlet nozzle 32. Extending from driver lid 44 is pipe nipple 58 which is inserted through a bore 60 in lid 44. The end of pipe nipple 58 is inserted such that it is flush with the interior face of lid 44 and the resultant seam is penetration welded and ground smooth in like manner as that described with regard to nipple 26. Extending radially from nipple 58 is ferrule 62. Clamp 64 which is identical to clamp 34 maintain blind ferrule 66 in sealing relationship with ferrule 62. There is a gasket 68 residing between ferrule 62 and blind ferrule 66. This arrangement creates nozzle 70 which can be used as a pressure test port for driver 12.

At the opposite end of driver 12 is butt weld ferrule 72. Butt weld ferrule 72 is full penetration welded to driver 12 and the resultant inside weld seam is ground smooth and polished such that there is substantially no seam to accumulate powdered material. Bell 74 has a narrow end 76 and a wide end 78. Affixed to narrow end 76 of bell 74 is a butt weld ferrule 80 which is full penetration welded in like manner as described for butt weld ferrule 72. The weld is once again ground smooth and polished from the inside so that there are no grooves or seams in which powdered material can accumulate. A clamp 81 which is identical to clamp 34 except for size is used to connect butt weld ferrule 72 to butt weld ferrule 80. Residing there between is gasket 82, which is an O-ring type gasket having planar extensions about its circumference parallel to the faces of ferrules 72 and 80.

Extending radially from bell 74 is mounting flange 84. Mounting flange 84 allows the sanitary acoustic horn of the present invention to be mounted to the side of a baghouse such that the wide end of bell 74 extends into the baghouse. Therefore, the majority of the inner face 86 of mounting flange 84 will come in contact with powdered product. It is thus necessary to attach flange 84 to bell 74 by a continuous fillet weld 88 to create an air tight connection. Fillet weld 88 should be ground and polished to a minimum ⅛" radius to inhibit accumulation of powdered product in that location.

It should be recognized that powdered product will come in contact with the inner surfaces of bell 74 and therefore, such surface should have a number 4 finish or better. The bell 74 and driver 12 are preferably made of 304 stainless steel and provided with this number 4 finish or better. Powdered product may also travel to the internal portion of driver 12, past diaphragm 56 and into annular channel 20. Note that annular channel 20 is provided with corners 90 at the base thereof to inhibit collection of powder in such corners and to allow for easier cleaning. Curved corners 90 should have at least a ¼" radius. Further, the distance between the outside face of cylindrical section 14 and the inside face of wall 24 is preferably at least 1⅛" to allow for the cleaning of the annular channel 20. In any case, the width of annular channel 20 must be great enough to allow free insertion of human fingers with cleaning cloths so that annular channel 20 can be properly cleaned to meet U.S.-D.A. regulations. Further, it has been found that it would be difficult to provide corners 90 with a minimum ¼" radius if the width of channel 20 is allowed to fall below 1⅛".

In the preferred embodiment, it is preferable to form driver 12, wall 24 and compressed air delivery chamber 18 from a single piece of 304 stainless steel. In other words, driver 12, air delivery chamber 18 and wall 24 are machined from a single piece of stainless steel bar stock. Alternatively, air delivery chamber 18 and wall 24 can be machined from a separate piece and attached to driver 12 by welding.

The acoustic horn of the present invention is designed to be installed to an outer wall or surface of the dryer system equipment to allow all external connections of the acoustic horn's driver to be out of the product stream. However, as noted above, the wide section or bell mount 78 will be inside the equipment thus allowing powdered product to contact all internal surfaces of the bell 74 and driver 12. This requires that such internal surfaces be designed to inhibit accumulation of powdered product and further, such internals must be designed to allow for efficient manual cleaning thereof. These requirements are accomplished, in part, through the use of a number 4 finish and of the quick connect sanitary ferrules and clamps.

To attach the sanitary acoustic horn under the present invention to the equipment wall, flange 86 is used in combination with a mounting sleeve which is fitted and welded a side wall or roof penetration of the vessel. Such sleeve allows an opening for the bell end 78 to generate acoustic waves in to the vessel. The outer end of the sleeve, which is also constructed of 304 stainless steel with a number 4 finish on all internal surfaces, has a flange attached to it, that flange meets with flange 86 with a gasket residing therebetween and the flanges are fastened by means of a V-shaped band clamp.

From the foregoing, it will be seen that this invention is one well adapted to obtain all of the ends and objects hereinabove set forth, together with other advantages which are obvious and which are inherent to the device.

It is to be understood that certain features and sub-combinations are of utility and may be employed with reference to other features and sub-combinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A sanitary acoustic horn comprising:
   a driver having internal and external surfaces;
   an air delivery chamber having internal corners extending about said driver, and having a predetermined width of sufficient dimension to allow insertion of human fingers;
   a first sanitary ferrule connected to said driver;
   a bell having a second sanitary ferrule extending therefrom;
   a quick connect clamp for connecting said first sanitary ferrule to said second sanitary ferrule, said bell and the internal surfaces of said driver and said air delivery chamber having a minimum number 4 finish.

2. A sanitary acoustic horn as recited in claim further comprising:
   a mounting flange extending radially from said bell, said mounting flange attached to said bell by a continuous, air-tight fillet weld which is ground and polished to a minimum ⅛" radius.

3. A sanitary acoustic horn as recited in claim 1 wherein:
   the width of said air delivery chamber is a minimum of 1".

4. A sanitary acoustic horn as recited in claim 1 wherein:
   the width of said air delivery chamber is a minimum of 1⅛".

5. A sanitary acoustic horn as recited in claim 1 wherein:
   the internal corners of said air delivery chamber have a minimum ¼" radius.

6. A sanitary acoustic horn as recited in claim 1 further comprising:
   a driver lid mounted to said driver;
   a diaphragm located between said driver and said driver lid.

7. A sanitary acoustic horn as recited in claim 6 further comprising:
   a diaphragm support lip extending from said driver; and
   an annular extension from said lid which inserts into said air delivery chamber trapping said diaphragm between said annular extension and the inner surface of said air delivery chamber and stretching said diaphragm across said diaphragm support lip.

8. A sanitary acoustic horn as recited in claim 7 wherein:
   said lid includes an inner surface forming a cupped area having a circumferential corner with a minimum ¼" radius.

9. A sanitary acoustic horn as recited in claim 1 further comprising:
   a compressed air inlet nozzle affixed to said air delivery chamber, said air inlet nozzle having a sanitary ferrule extending therefrom for attachment to a sanitary ferrule mounted on a compressed air delivery conduit.

10. A sanitary acoustic horn for use in minimizing powder product build-up in dairy industry drying equipment comprising:
- a driver having internal and external surfaces;
- a lid attached to said driver, said lid having an annular extension forming a cupped chamber, said cupped chamber having corners with a minimum ¼" radius;
- an air driver chamber extending about said driver, said air delivery chamber having sufficient width to allow insertion of human fingers;
- a diaphragm support lip extending from said driver;
- a first sanitary ferrule connected to said driver;
- a bell having a second sanitary ferrule extending therefrom; and
- a quick connect clamp for connecting said first sanitary ferrule to said second sanitary ferrule, said bell in the internal surfaces of said driver, said lid and said air delivery chamber having a minimum number 4 finish.

11. The sanitary acoustic horn of claim 1 wherein there is disposed an O-ring gasket between each of said ferrules, said O-ring gasket including a filter disk for precluding entry of foreign matter therethrough the compressed air inlet nozzle so as to enhance the sanitary ability of the horn while it is in operation by obstructing entry of contaminants to the interior of a dryer system to which the horn may be attached.

12. The sanitary acoustic horn of claim 11 comprising:
- a mounting flange extending radially from said bell, said mounting flange attached to said bell by a continuous, air tight fillet weld which is ground and polished to a minimum ⅛" radius.

13. The sanitary acoustic horn of claim 12 wherein the width of said air delivery chamber is a minimum of 1" so as to facilitate manual cleaning thereof.

* * * * *